March 12, 1957 J. J. KEYNER 2,785,325
ELECTRIC MOTOR DRIVE MECHANISM
Filed Sept. 7, 1954
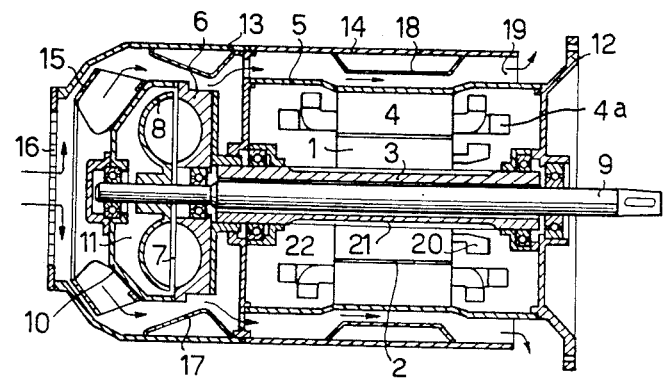
Inventor
Jan J. Keyner
By Cushman, Darby & Cushman
Attorneys

United States Patent Office 2,785,325
Patented Mar. 12, 1957

2,785,325

ELECTRIC MOTOR DRIVE MECHANISM

Jan J. Keyner, Heerlen, Netherlands, assignor to Stamicarbon N. V., Heerlen, Netherlands Application September 7, 1954, Serial No. 454,425

Claims priority, application Netherlands September 7, 1953

4 Claims. (Cl. 310—78)

This invention relates to an electric motor drive mechanism, particularly but not exclusively adapted for use with conveying and/or cutting machines used in mechanical mining.

The motor drives of conveying and cutting machines used in the mining industry must be compactly designed, due to the restricted space available therefor. Moreover, since in use the drive is usually inadequately supported on the floor on which it is set up, or is engaged cantilever fashion to the driven machine by means of flanges, a bending moment may be exerted which increases in magnitude with increase in distance between the center of gravity of the drive and the driven machine. Accordingly, it is desirable that the motor drive be designed with its center of gravity as close as possible to that end adapted for connection to the driven apparatus. Furthermore, it is necessary that the motor be coupled to the apparatus to be driven in such manner that the large load variations and the very high starting resistances encountered in operating such conveying and cutting machines can readily be absorbed and overcome, without stalling or other operational difficulties.

It is an object of the present invention to provide an electric motor drive mechanism of compact construction.

Another object of the invention is to provide an electric motor drive having its center of gravity close to that end thereof which is adapted for connection to the driven apparatus.

Another object is to provide an electric motor drive suitable for high starting loads and greatly fluctuating loads.

Another object is to provide an electric motor drive which accelerates smoothly, and requires a low starting current during the starting period.

Another object of the invention is to provide an electric motor drive capable of slipping in the event of sudden load variations, without being subjected to wear of relatively sliding surfaces.

Still another object is to provide an electric motor drive which is effectively cooled by means of air, and in which the direction of the cooling air is independent of the direction of rotation of the motor.

Yet another object is to provide an electric motor drive comprising a fluid coupling requiring only a small amount of liquid, and in which the motor is enclosed by a flameproof casing.

These and other objects of the invention will be apparent in the following detailed description and the appended claims.

The invention may best be understood with reference to the accompanying drawing, in which the figure is a longitudinal axial section of a preferred embodiment.

Referring more particularly to the drawing, the rotor 1 of an electric motor 2 is mounted on a hollow shaft 3. The stator 4, the windings 4a of which are shown diagrammatically, is enclosed in a casing 5, which isolates the interior of the motor 2 from the surrounding atmosphere. As a result, if the motor 2 is installed in a space containing an explosive gas mixture, such as firedamp, sparks generated in the motor will be prevented from igniting the gas.

One end of the hollow shaft 3 projects beyond the motor casing 5, on which end the impeller 6 of a fluid flywheel coupling 7 of the traction type is fixedly engaged, as by shrinking. The impeller 6 co-acts with a turbine wheel follower 8, mounted on the driving shaft 9. The shaft 9 extends through the hollow rotor shaft 3, and projects on the other side of the motor for coupling to the apparatus to be driven, for example by way of a reduction gear, not shown. A cover 10, connected to the impeller 6, encloses the turbine wheel 8 forming a closed compartment 11 which contains the coupling liquid, such as oil. The motor casing 5 is provided with a flange 12 for mounting the motor drive on the apparatus to be driven.

The fluid flywheel coupling 7 is enclosed in a housing 13, which is connected to a housing 14 mounted around the motor casing 5. The cover 10 of the fluid flywheel 7, which together with the impeller 6 is driven by the motor 2, is provided with fan blades 15. The fan blades 15 are so disposed that air is drawn into the housing 13 through a central opening 16 in the housing, and impelled outwardly in substantially radial direction. The air passes over the cover 10 and is then constrained to flow closely over impeller 6 by an annular surface 17 disposed around the impeller and mounted on the inner surface of housing 13. In this way, the fluid coupling 7 and the oil contained therein are adequately cooled. Next, the air passes through the space between motor casing 5 and housing 14, in the course of which travel the internally projecting annular surface 18 causes it to flow in close contact with that part of the motor casing 5 to which the stator 4 is connected. As a result, the motor casing 5 and the enclosed stator 4 are also cooled. The air leaves the space between motor casing 5 and housing 14 through an annular opening 19.

On one side of the rotor 1, fins 20 are mounted. When the motor is rotating, the fins 20 draw air from the space 22 on the other side of the rotor, through grooves 21 in the hollow shaft 3. In its travsl, the air absorbs heat from the rotor 1, whereafter it returns to space 22 through the stator windings 4a and through the space between the stator 4 and the rotor 1. On its return travel, the air heated by the rotor is cooled. In this manner, even though the motor is enclosed by a flameproof enclosure, it is effectively cooled.

The drive mechanism according to the invention is of compact construction, and when mounted and drivingly connected, the weight of the motor, by which the location of the center of gravity of the drive mechanism is mainly determined, is much closer to the driven apparatus than in the case of a drive mechanism having a coupling mounted between the motor and the driven apparatus.

The provision of a coupling constructed as a fluid flywheel has the advantage that during the starting period of the motor, the apparatus to be driven, even though it has a high starting resistance, is smoothly accelerated. Also, in the event of sudden load variations the coupling slips without causing wear, such as would arise e. g.. with relatively sliding surfaces. The drive mechanism according to the invention accordingly is well suited for driving machines which are difficult to start, and which are subjected to great load fluctuations, such as conveyors, mining machines, crushers, etc.

The fluid coupling is effectively cooled, and the motor is cooled also, even though enclosed in a flameproof enclosure. This permits the coupling to be designed to contain a smaller quantity of liquid than would otherwise be necessary to maintain the temperature of the liquid below the permissible limit. The use of a smaller quantity of liquid enables the motor to start more readily, even during a voltage drop, and a lower starting current is required.

As the fan blades 15 are radially disposed, a continuous current of cooling air passes first over the fluid coupling and then past the motor, the direction of the air current remaining unaffected by a reversal in direction of rotation of the motor. This phenomenon does not occur in fans wherein the air is made to flow through blades parallel with the fan axis. In the latter type of fans, the air current changes direction of flow with the direction of rotation, so that in one direction of rotation the cooling air would be first directed past the hot motor and then over the fluid flywheel coupling. In this event, the coupling would be less effectively cooled.

It is to be understood that the form of the invention herewith shown and described is to be taken as a preferred embodiment of the same, and that various changes may be made without departing from the spirit of the invention or the scope of the appended claims.

I claim:

1. A drive mechanism comprising an electric motor mounted on a rotor shaft, a drive shaft, a fluid coupling connecting said rotor shaft to said drive shaft, a flameproof casing enclosing said motor, a housing enclosing both said fluid coupling and said motor casing, said housing being provided at the fluid coupling end thereof with an axial inlet port and at the opposite end thereof with an outlet, and fan blades mounted on the motor actuated part of said fluid coupling, said fan blades being effective to impel a cooling air stream through said housing flowing first over said fluid coupling and then over said motor casing.

2. A drive mechanism as defined in claim 1, including means fixed to the interior of said housing constraining said air stream to flow closely over said fluid coupling and over said motor casing where the motor stator is connected thereto.

3. A drive mechanism comprising an electric motor mounted on a hollow rotor shaft, a fluid coupling, the impeller of the fluid coupling being engaged to said rotor shaft and including a cover forming a closed compartment for the coupling liquid, a drive shaft extending through said rotor shaft, the turbine wheel of said fluid coupling being in said closed compartment and engaged to one end of said drive shaft, a flameproof casing enclosing said motor, a housing enclosing both said fluid coupling and said motor casing, said housing being provided at the fluid coupling end thereof with an axial inlet port and at the opposite end thereof with an outlet, and radially disposed fan blades extending from said coupling cover on the side thereof remote from the motor, said fan blades being effective to impel a cooling air stream flowing initially radially and then axially over said fluid coupling, and then over said motor casing.

4. A drive mechanism as defined in claim 3, including means fixed to the interior of said housing constraining said air stream to flow closely over said fluid coupling and over said motor casing where the motor stator is connected thereto.

References Cited in the file of this patent

UNITED STATES PATENTS

| 2,182,926 | Manz et al. | Dec. 12, 1939 |
| 2,449,494 | Ludwig et al. | Sept. 14, 1948 |
| 2,449,905 | Lotts et al. | Sept. 21, 1948 |

FOREIGN PATENTS

| 193,211 | Switzerland | Dec. 16, 1937 |